Figure 4:
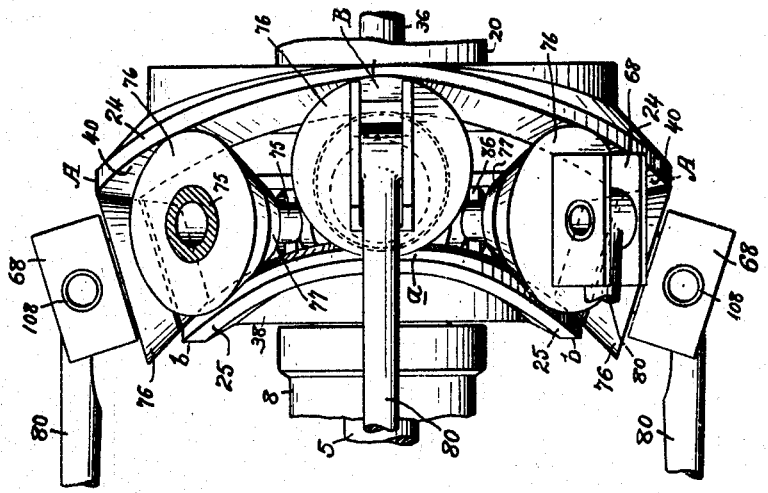

Aug. 12, 1930.  C. C. WILLIAMS  1,772,531
MECHANICAL MOVEMENT
Filed June 29, 1929     5 Sheets-Sheet 1
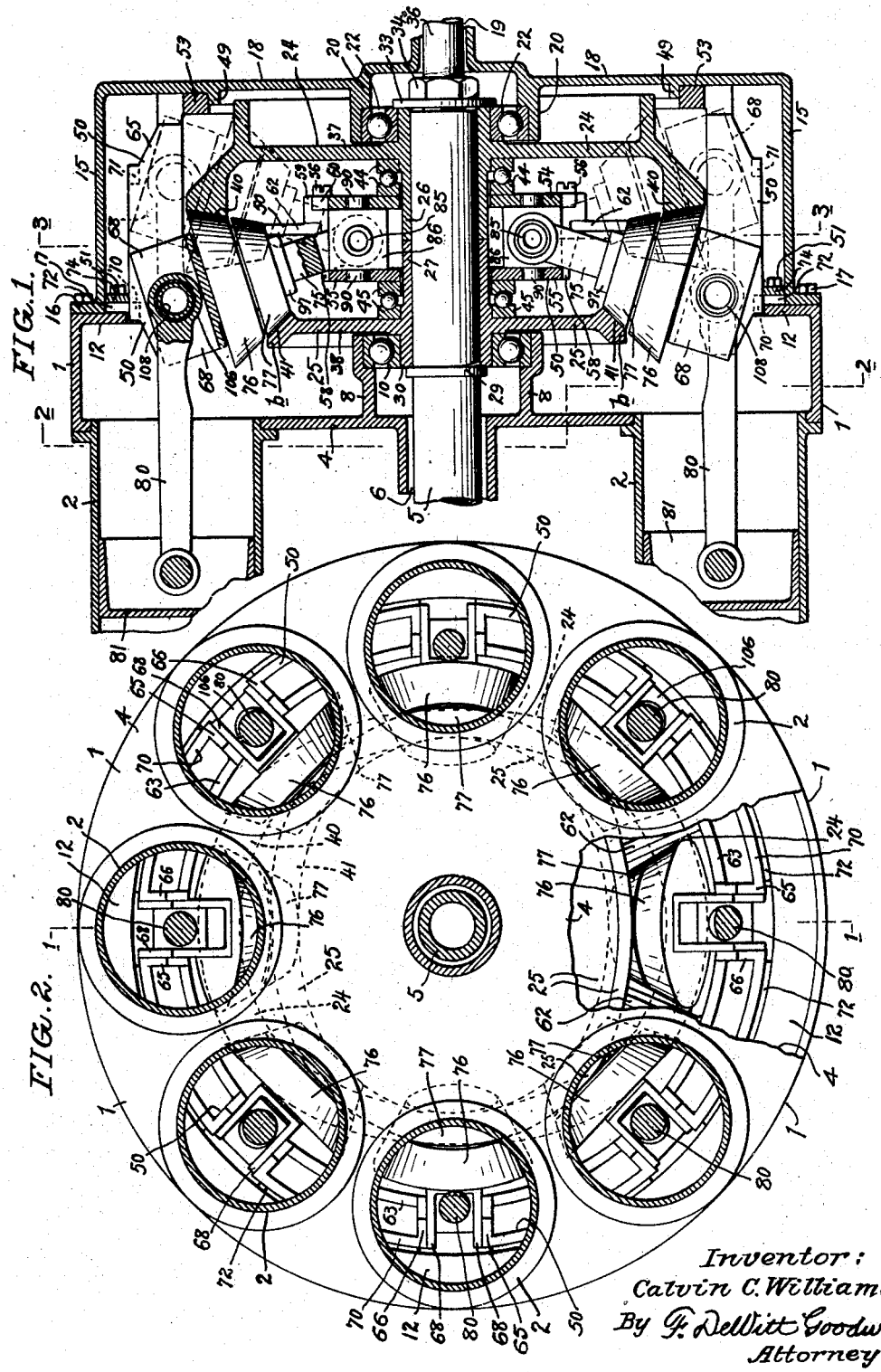
Inventor:
Calvin C. Williams
By F. DeWitt Goodwin
Attorney Aug. 12, 1930.  C. C. WILLIAMS  1,772,531
MECHANICAL MOVEMENT
Filed June 29, 1929  5 Sheets-Sheet 2

Inventor:
Calvin C. Williams
By G. DeWitt Goodwin
Attorney

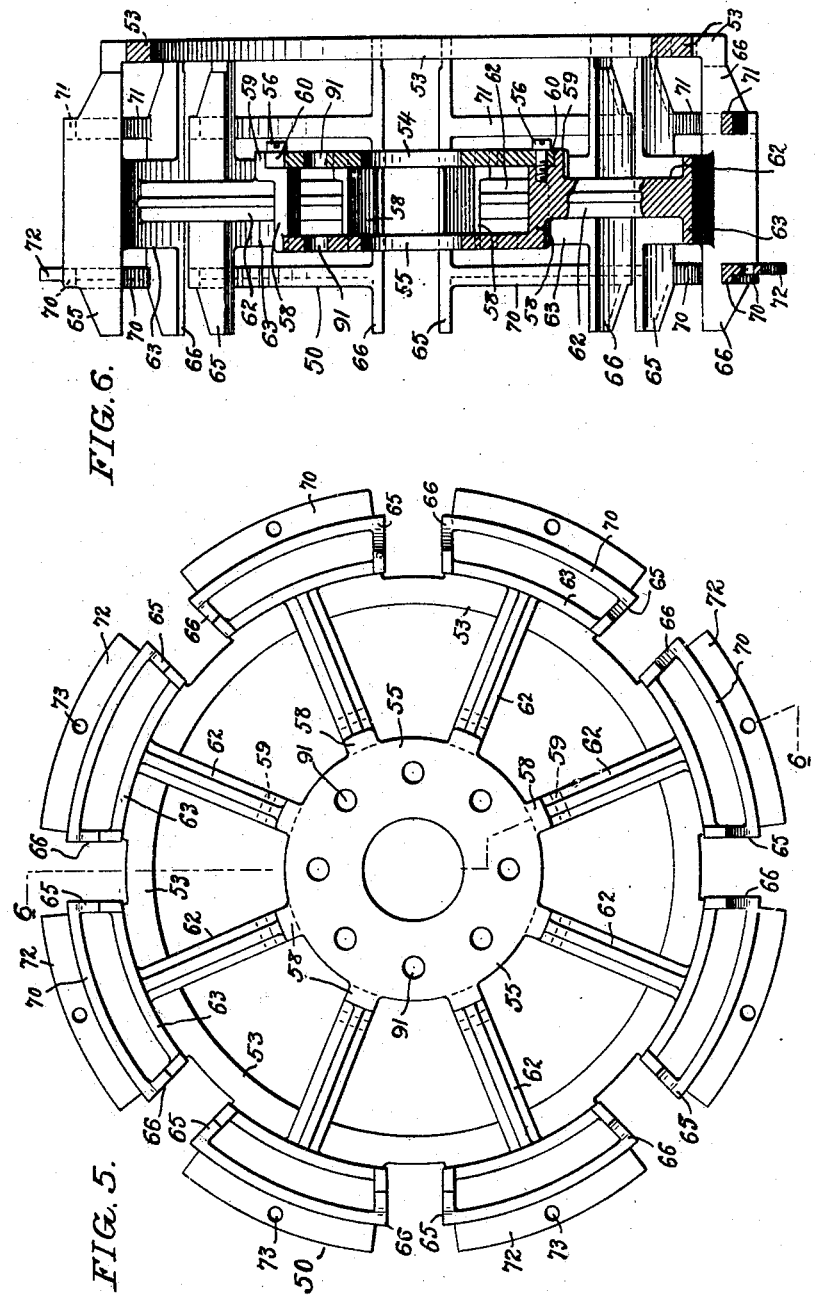
Aug. 12, 1930.  C. C. WILLIAMS  1,772,531
MECHANICAL MOVEMENT
Filed June 29, 1929   5 Sheets-Sheet 3
Inventor:
Calvin C. Williams
By F. DeWitt Goodwin
Attorney

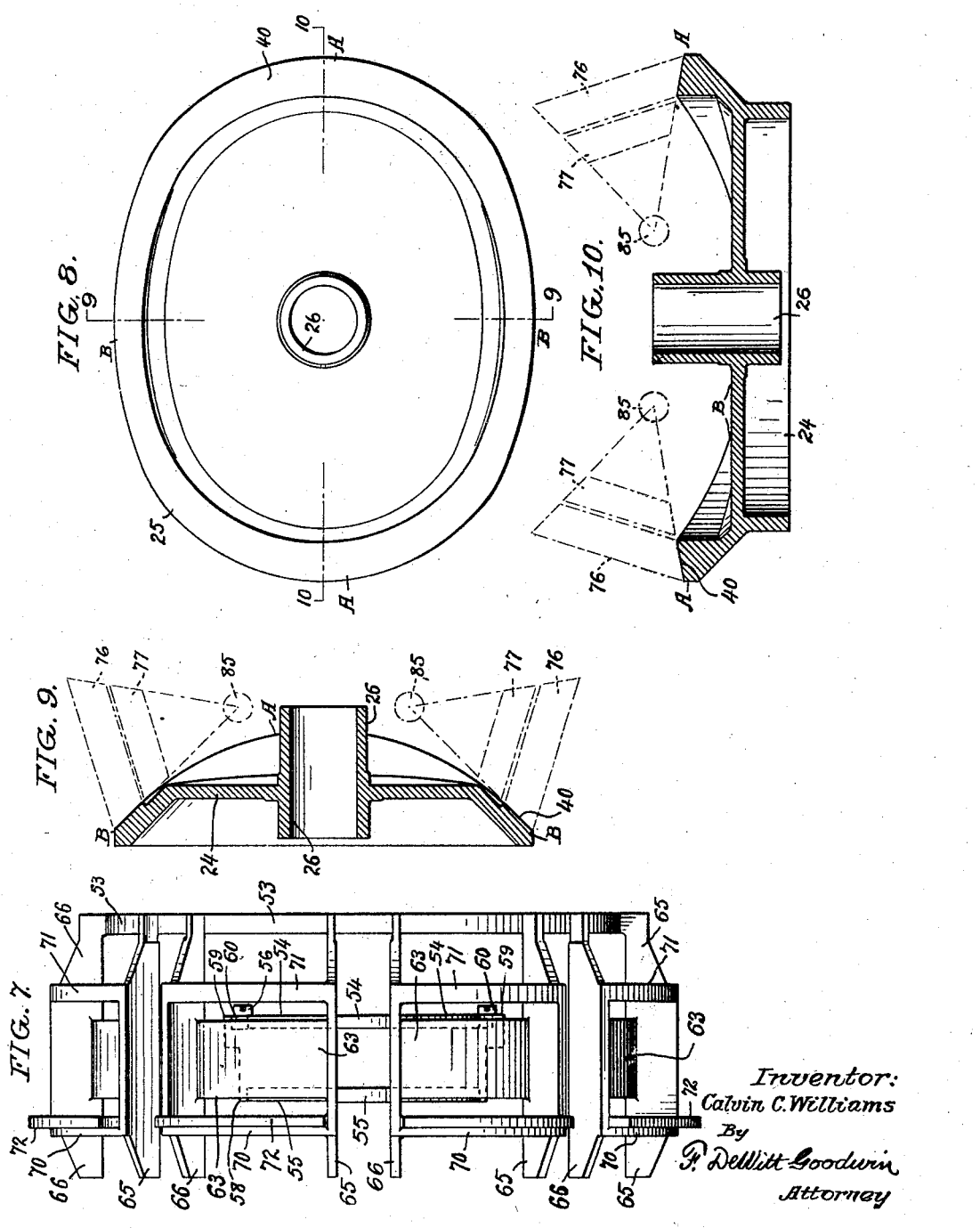

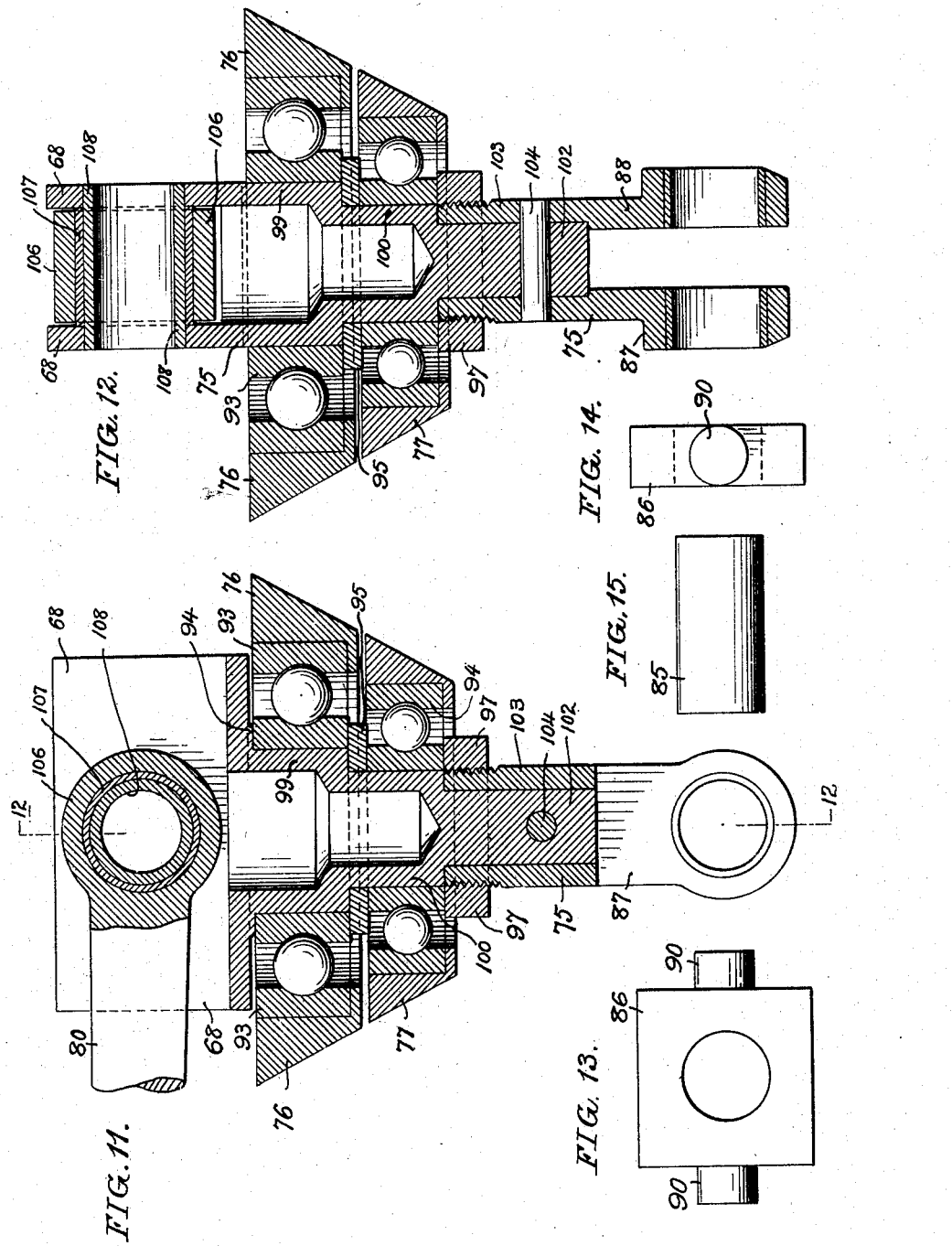

Patented Aug. 12, 1930

1,772,531

UNITED STATES PATENT OFFICE

CALVIN C. WILLIAMS, OF PHILADELPHIA, PENNSYLVANIA

MECHANICAL MOVEMENT

Application filed June 29, 1929. Serial No. 374,721.

My invention relates to improvements in a mechanical movement, particularly adapted for use in internal combustion engines, pumps and the like, in which it is desired to convert reciprocating motion into rotary motion, or vice versa. The embodiment of my invention as herein illustrated and described, comprises an engine having a plurality of cylinders arranged upon a casing in parallel relation to the main or driving shaft of the engine, said cylinders having reciprocating pistons operatively mounted therein and my novel mechanical movement for converting the reciprocating motion of the pistons into rotary motion for rotating the main shaft.

The object of my invention is to provide a device for transmitting motion in which the operating force is continuously applied to the parts acted upon, thereby producing a balanced mechanism in which the vibration is reduced to a minimum; a further object is to provide arms positioned radially relatively to the main shaft, having their inner ends pivoted adjacent to said shaft and their outer ends connected with the reciprocating members for oscillating the arms, thus insuring the full power of the reciprocating members being transmitted through the arms; a still further object is to provide conical rollers upon the oscillating arms, and cams having conical working faces engaging said rollers, said working faces of the rollers and cams being so constructed that the line of contact between the faces of the rollers and cams will pass through the center of oscillation of the arms, thereby insuring the working faces of the rollers and cams being in contact during the complete revolution of the cams; a still further object is to provide separate cams upon the main shaft positioned in spaced relation to each other thus providing sufficient space between the cams for locating the pivot points of the radial arms adjacent to the main shaft.

A further object is to provide a frame positioned between said cams upon which said arms are pivotally mounted and providing means for detachably securing the frame to the casing in which the main shaft is mounted, thereby providing a construction which permits the casing to be small, compact and symmetrical in form, and no larger in diameter than is necessary to accommodate the cylinders; a further object is to provide means for operatively mounting separate rollers upon each radial arm and providing novel forms of cams for engaging the rollers; a still further object is to provide means for adjusting the position of the rollers relatively to the cams, whereby variations due to wear may be eliminated, thus insuring perfect contact between the rollers and cams throughout the complete revolution of the cams, and a still further object is to so construct the cams and rollers that they will expand and contract equally under changes of temperature, thus insuring a perfect contact between their working faces at all times. These together with various other novel features of the construction and novel arrangements of the parts, which will be hereinafter more fully described and claimed, constitute my invention.

Figure 3:
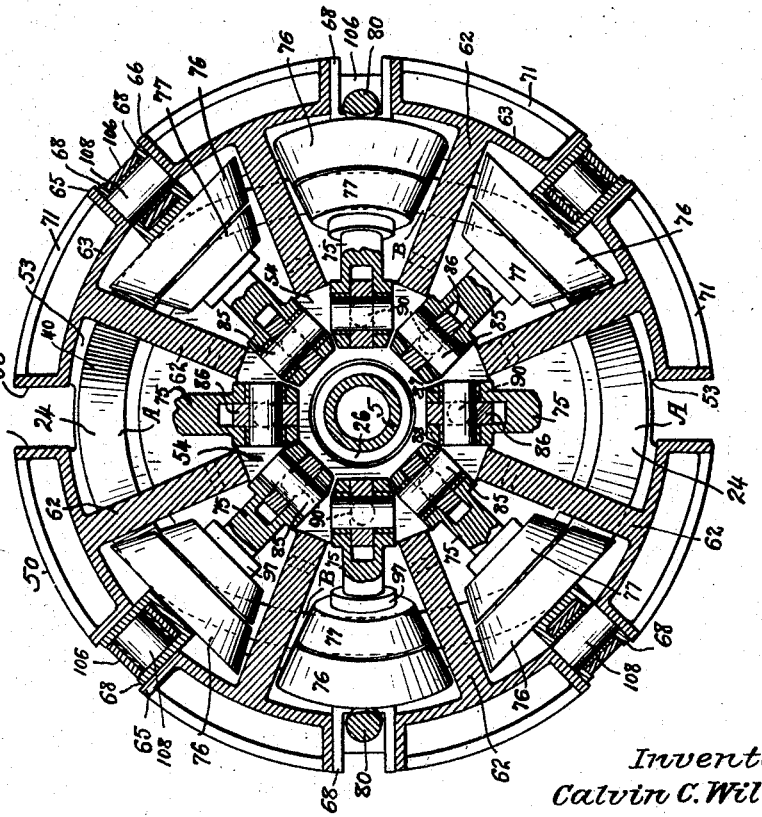

Referring to the accompanying drawings, Fig. 1 is a central longitudinal sectional view of a portion of an engine showing my novel mechanism for converting reciprocating motion into rotary motion; Fig. 2 is a transverse sectional view on line 2—2, Fig. 1; Fig. 3 is a transverse sectional view on line 3—3, Fig. 1; Fig. 4 is a side elevation of the cams and rollers, shown detached from the cylinders and casing of the engine; Fig. 5 is an end view of the central frame detached, which frame forms the cross-head guides and the supports for the bearings for the pivot ends of the radial arms; Fig. 6 is a longitudinal sectional view of the frame as on line 6—6, Fig. 5.

Fig. 7 is a view in elevation of the frame shown in Figs. 5 and 6; Fig. 8 is a face view of the larger or power cam, detached; Fig. 9 is a sectional view of the cam, as on line 9—9, Fig. 8; Fig. 10 is a sectional view of the cam, as on line 10—10, Fig. 8; Fig. 11 is a central sectional view, drawn on a larger scale, showing the radial arm, the cross-head and the rollers; Fig. 12 is a sectional view as on line 12—12, Fig. 11; Fig. 13 is a detached view of the bearing block for mounting the radial arm upon the central frame; Fig. 14 is a side elevation of the bearing block shown in Fig. 13; and Fig. 15 is a detached view of the pivot pin for mounting the radial arm upon the pivot blocks, shown in Figs. 13 and 14.

In the accompanying drawings in which like reference characters refer to like parts, 1 represents a casing upon which are secured cylinders 2 arranged in circular formation at equal distances from the center of the casing.

The present embodiment of my invention, as illustrated in the accompanying drawings, is applied to an eight cylinder engine in which the cylinders 2 are secured upon the transverse wall 4 of the casing 1 with the longitudinal axes of the cylinders extending parallel with the main shaft 5 of the engine. The wall 4 of the casing is provided with a central opening 6, which is occupied by the main shaft 5, and said casing 1 is also provided with a bearing housing 8 in which is located a ball, or roller, bearing 10 in which said shaft rotates. The casing 1 is of circular formation and its transverse wall opposite to that upon which the cylinders are mounted is in the form of an inwardly projecting flange 12 having a facing surface upon which a casing cover 15 is secured.

Said casing cover 15 is provided with an outwardly projecting flange 16, which is bolted to the facing surface of the flange 12 by means of bolts 17. The opposite end of the casing cover 15 is provided with a transverse wall 18 having a central opening 19 in alignment with the shaft 5 and said wall 18 is also provided with a bearing housing 20 in which is mounted a ball bearing 22 in which the shaft 5 is rotatably mounted, thus the main shaft is rotatably mounted between the bearings 10 and 22. Upon the main shaft 5 are secured, by any suitable means, two cams 24 and 25, which rotate with said shaft. Said cams are provided with central sleeves 26 and 27 through which the shaft extends and upon which said bearings 10 and 22 are mounted, so that the shaft 5 and the cams 24 and 25 may rotate in said bearings. The shaft 5 is provided with a collar 29 against which one end surface 30 of the sleeve 27 of the smaller cam abuts. The adjacent ends of the sleeves 26 and 27 abut against each other and the other end 32 of the sleeve 26 of the cam 24 is engaged by a washer 33, which is clamped by means of a nut 34 threaded upon a reduced portion 36 of the shaft 5 for clamping the sleeves tightly against the collar 29.

The cams 24 and 25 have disk portions 37 and 38, which extend transversely from the central sleeves 26 and 27, and upon said disk portions are formed cam surfaces, or working faces 40 and 41. Adjacent to the inner surfaces of the disk portions of the cams 24 and 25 and surrounding the sleeves 26 and 27 are provided ball thrust bearings 44 and 45. Between the bearings 44 and 45 is mounted a central frame 50, shown in Fig. 3 and shown detached in Figs. 5, 6 and 7. The outer portion of the frame 50 is rigidly secured to the flange 12 of the casing 1 by means of bolts 51, shown in Fig. 1.

The casing cover 15, shown in Fig. 1, is provided upon its transverse wall with a cylindrical flange 49, around which fits a ring 53 forming part of the central frame 50, more clearly shown in Figs. 5, 6, and 7.

The central frame 50 is provided with two disks 54 and 55 the latter of which is an integral part of said frame 50 and is mounted adjacent to the bearing 45. The other disk 54 is detachably mounted upon said frame 50, by means of bolts 56 and is located adjacent to the bearing 44. Said disks 54 and 55 are held in spaced relation to each other by means of longitudinal members 58. Said members 58 are rigidly mounted upon the disk 55 at one end thereof and provided at their opposite end with enlarged bosses 59 having recesses into which outwardly projecting ears 60 are fitted and held by the bolts 56. The longitudinal members 58 carry radial braces 62, having segmental members 63 mounted upon their outer ends, which members 63 extend between two cross-head guides 65 and 66, which guides extend longitudinally relatively to the shaft 5. Said guides 65 and 66, which are located adjacent to each other, have facing surfaces thereon which are parallel to each other, thus forming a channel through which the cross-head 68 is adapted to slide. One end of the guides 65 and 66 is formed integral with said ring 53. Between the two guides 65 and 66, which are connected by the segmental member 63, are also connecting segmental braces 70 and 71. The brace 70 is provided with an outwardly projecting flange 72, which is bolted against the flange 12 of the casing 1, as above mentioned. An annular detachable ring 74, shown in Fig. 1, is positioned upon the segmental flanges 72 for strengthening the latter. The flanges 72 are provided with holes 73 for the passage of the bolts 51 which clamp the ring 74 and the flanges 72 to the flange 12 of the casing 1, thus providing means for rigidly holding the central frame 50 to the casing 1 and also providing means for readily detaching said frame from the casing.

The disks 54 and 55 of the central frame 50 form bearings for the oscillating arms 75 carrying the rollers 76 and 77, which engage the working faces of the cams 24 and 25, respectively. The outer ends of the radial arms carry said cross-heads 68, which are mounted in said cross-head guides 65 and 66. Connecting rods 80 are pivotally connected with the cross-heads 68 and also with the pistons 81 slidably mounted in the cylinder 2. Said pistons form reciprocating members which may be operated as in any type of engine.

The arms 75 carrying the rollers are positioned radially relatively to the main shaft 5, as shown in Fig. 3. The inner ends of the arms 75 are pivoted on pivot pins 85 which are detachably mounted in the bearing blocks 86 located between the end members 87 and 88 of the bifurcated portions of the arms 75, shown more clearly in Figs. 11 and 12. Said bearing blocks 86 are mounted between the disks 54 and 55 by means of stud-shafts 90 on the bearing blocks 86, which stud-shafts enter holes 91 arranged in longitudinal alignment in the disks 54 and 55, thus providing means for permitting the bearing blocks 86 to turn slightly on the stud-shafts and permit the radial arms to align at their outer ends with the cross-head guides 65 and 66, so that the latter will fit perfectly between said guides. After the cross-heads are properly mounted in said guides there is no further movement of the bearing blocks on the stud-shafts 90.

However, the radial arms 75 may oscillate upon the pivot pins 85, from the position shown in full lines to the position shown in dot and dash lines, in Fig. 1, which movement is equal to the full stroke of the pistons.

The construction of the radial arms 75 is shown in the enlarged views, Figs. 11 and 12. Two rollers 76 and 77 are mounted upon ball or roller bearings 93 and 94 on each arm. The inner race of the bearing 93 is clamped between the shoulder 94 formed upon the inner wall of the cross head 68 and a washer 95 which is clamped by the inner race of the bearing 94, which in turn is clamped by a nut 97 threaded upon the arm. The bearing 93 of the larger roller is mounted upon the larger cylindrical portion 99 of the radial arm and is held in place by said washer 95, which also separates the rollers 76 and 77. Said washer 95 and the bearing 94 of the smaller roller are mounted upon a reduced portion 100 of the arm whereby the inner races of the bearings may be rigidly clamped upon the arm by the nut 97. This construction permits the rollers to be adjusted upon the arm by inserting shims adjacent to the shoulders 94 or the washer 95, for taking up any wear of the rollers or cams. The radial arms are made in two sections, one section having a shank 102 and the other having a sleeve 103 to receive the shank. Said shank and sleeve are rigidly secured together after the rollers have been assembled upon the arm by means of a pin 104.

The outer end of each arm 75 is provided with parallel walls which form the cross-head 68, which is of channel formation with open ends for the free passage of the connecting rod 80. The head 106 of the connecting rod 80 is mounted upon a sleeve 107, which is tightly fitted between the side walls of the cross-head 68 and said sleeve is pivotally mounted upon a hollow crank pin 108 which in turn is mounted in the side walls forming the cross-head 68.

The rollers 76 and 77, carried by the radial arms, are of conical formation and their faces are in contact with the working faces 40 and 41, respectively of the cams 24 and 25 during the entire revolutions of the cams. The larger or power cam 24 is engaged by the larger rollers 76 and the smaller cam 25 is engaged by the smaller rollers 77.

The cam 24 is provided with two high places, A—A and two low places B—B, which are diametrically opposite to each other, as shown in Figs. 8, 9 and 10. The smaller cam 25 is also provided with high and low places a—a and b—b respectively, diametrically opposite to each other, as clearly illustrated in Fig. 4 of the drawings. Figs. 2, 3, and 4 show the relative positions of the cams 24 and 25. The longer axis of the larger cam 24 is at right angles to the longer axis of the smaller cam 25, as shown in dotted lines, Fig. 2. The cams are of different sizes or diameters, to engage the rollers 76 and 77 which are located upon the arms 75 at different distances from the pivot pins 85, and said cams are of elliptical formation to provide for the oscillating movements of the arms and rollers which swing through arcs having the pivot pins 85 as centers. By this construction the working faces of the cam and rollers are always in full engagement at the line of contact between their working faces, which line if extended would pass through the pivot pins 85, which is the center of oscillation of the rollers, as illustrated in dotted lines Figs. 9 and 10.

The operation of my invention is as follows: The larger cam 24 receives the force of the working stroke of the pistons through the connecting rods and the larger rollers 76. The working stroke of the piston forces the piston outwardly of the cylinder and forces the roller 76 from the high place to the low place of the larger or power cam 24, thus rotating the cams 24 and 25 and the main shaft 5.

The radial arms 75 do not rotate with the main shaft 5, but oscillate on the pins 85, which are mounted in said bearing blocks 86 upon the central frame 50, adjacent to the main shaft 5. The smaller roller 77 is in contact with the smaller cam 25 during the entire revolution of the latter. Said cam 25 is of such formation that the smaller roller 77 will be actuated by said cam, thus moving said roller 77 and the radial arm 75 through the proper path for insuring the larger roller 76 always being held tightly against the larger cam 24. The two rollers 76 and 77 rotate upon the radial arms 75 in opposite directions and each roller presses against its respective cam sufficiently to eliminate all lost motion. Means are provided for taking up any wear between the working faces of the cams and rollers.

When my invention is applied to an engine as illustrated in the drawings, the pistons may be operated in any suitable manner such as found in any internal combustion type of engine. The connection rods impart a reciprocating motion to the cross-heads, and the arms 75, which are positioned radially relatively to the main shaft 5. The working stroke of the piston forces the larger roller 76 against the downwardly inclined surfaces of the power cam 24 and rotates the cam and the shaft 5. In an eight cylinder engine, as shown in the drawings, the two cylinders, which are located diametrically opposite to each other, work in unison and thereby insure a perfectly balanced motion due to the fact that before the two opposite rollers have reached the low places of the power cam, another pair of rollers will receive the force from the working stroke of the next pair of pistons, thereby exerting a continuous pressure against the downwardly inclined portions of the power cam, thus insuring a continuous rotary movement of the cam and main shaft.

The smaller cam 25 acts as a follower upon the smaller rollers 77, of the radial arms 75, and moves the latter and also the pistons though the intake stroke of the pistons.

My improved construction permits the radial arms 75 to be pivoted close to the main shaft 5, thus insuring the entire surface of the rollers always being in contact with the entire surface of each cam during the full revolution of the cams. The rollers which engage the cams are positioned between the pivot pins 85 of the radial arms and the outer pivot shaft 108 upon which the connecting rods are mounted, thus the movement of the outer ends of the radial arms is equal to the stroke of the pistons. By this arrangement a greater force is applied to the power cams than that exerted upon the piston heads, due to an increase in leverage gained by having the roller 76 mounted upon the radial arm 75 between the connection of said arm and the connecting rod 80 and the pivot shaft 85 of the radial arms. By pivoting the radial arms adjacent to the main shaft 5 the casing may be made smaller than would be possible if the radial arms were pivoted upon the casing at points beyond the outer portions of the cams. The casing need not be any greater in diameter than is necessary to accommodate the cylinders, as the radial arms are pivoted adjacent to the main shaft and positioned between the cams.

The use of the central frame 50 for pivotally mounting the radial arms 75 adjacent to the main shaft 5 is made possible by my novel construction of employing two separate cams 24 and 25, between which the central portion, or disks 54 and 55, of the frame 50 are positioned and rigidly held in place by means of the bearings 44 and 45, which hold said disks from moving longitudinally relatively to the shaft 5, thereby eliminating any vibrations or longitudinal thrust which may be imparted to the central frame through the pivot pins of the radial arms.

Accessibility of all the parts may be had by simply removing the casing cover 15 and thus permitting the parts to be readily assembled, or removed.

My improved construction also permits the parts to be adjusted for taking up any wear that may occur between the working parts, due to the fact that the cams can be adjusted relatively to each other upon the main shaft by inserting shims between the adjacent ends of the sleeves 26 and 27 of the cams, or if it is desired to bring the cams closer together by removing some of the metal from the ends of the sleeves, so that the cams may be adjusted closer to each other. The rollers upon the radial arms may also be adjusted so that they will fit tightly against the cams by inserting shims, or removing some of the metal from the facing surface against which the rollers are clamped by means of the nut 97.

My improved mechanism may be employed as a pump having pumping cylinders in place of the engine cylinders, illustrated in the drawings. By applying a rotary motion to the main shaft the cams will impart a reciprocating motion to the pistons.

The construction of the radial arms, rollers and cams compensates for the law of expansion and contraction which insures a perfect mechanical operation at all times without causing any clearance, or binding between the working parts.

Various changes may be made in the construction and arrangement of the parts without departing from my invention.

I claim:

1. A device of the character described comprising a casing, a shaft rotatably mounted in the casing, an arm positioned within the casing extending radially relatively to said shaft, a bearing upon the casing located adjacent to said shaft in which said arm is pivoted, a reciprocating member mounted upon the casing operatively associated with the outer end of said arm, a cam secured upon said shaft, and a part upon said arm in operative engagement with said cam.

2. A device of the character described comprising a casing, a shaft rotatably mounted in the casing, a reciprocating member mounted upon the casing, a frame secured upon the casing, a bearing located upon said frame adjacent to said shaft, an arm having one end pivoted in said bearing, said arm positioned radially relatively to the shaft, a connection between the outer end of said arm and said reciprocating member, a roller upon said arm located between the pivot point of the latter and said connection with the reciprocating member, and a cam secured upon said shaft having a cam face in operative engagement with said roller.

3. A device of the character described comprising a casing, a shaft rotatably mounted in the casing, a reciprocating member mounted upon the casing, said casing having an inwardly extending frame, a bearing upon said frame located adjacent to the shaft, an arm positioned radially relatively to said shaft, a pivotal connection between said bearing and the inner end of the arm, a connection between the outer end of said arm and said reciprocating member, a cam secured upon said shaft, and a conical roller upon said arm in operative engagement with said cam.

4. A device of the character described comprising a casing, a shaft rotatably mounted in the casing, a reciprocating member mounted upon the casing, a cam secured upon the shaft, an arm pivotally mounted upon the casing adjacent to said shaft, said arm having its opposite end operatively associated with said reciprocating member, a roller upon said arm, said roller and said cam having engaging working faces with the line of contact of said faces extending through the center of oscillation of said arm carrying the roller.

5. A device of the character described comprising a casing, a shaft rotatably mounted in the casing, a reciprocating member mounted upon the casing, a cam secured upon the shaft, an arm having one end pivotally mounted upon said casing adjacent to said shaft and its outer end operatively associated with said reciprocating member, said arm positioned and adapted to oscillate in a plane extending through the longitudinal axis of said shaft, a roller upon said arm having a conical working face thereon the apex of which conical face coincides with the center of oscillation of said arm, and said cam having a working face of conical formation in operative engagement with the working face of the roller with the line of contact of the working face of the cam extending through the center of oscillation of said arm.

6. A device of the character described comprising a casing, a shaft rotatably mounted in the casing, a reciprocating member mounted upon the casing, cams secured upon said shaft having working faces in spaced relation to each other, said cams being of different diameters, an arm pivotally mounted upon the casing adjacent to said shaft, said arm positioned between said cams and adapted to oscillate in a plane extending through the longitudinal axis of said shaft, said arm having its outer end operatively associated with said reciprocating member, rollers rotatably mounted upon said arm at different distances from the pivot point of said arm, said rollers and said cams having working faces thereon with the lines of contact of said faces extending through the center of oscillation of said arm whereby the larger roller will be in contact with the larger cam and the smaller roller will be in contact with the smaller cam during the complete revolution of said cams.

7. A device of the character described comprising a casing, a shaft rotatably mounted in the casing, a plurality of reciprocating members mounted upon said casing and surrounding said shaft, a circular frame having its peripheral portion rigidly secured to said casing, a disk upon said frame surrounding said shaft, arms positioned radially relatively to said shaft, said arms having their inner ends pivotally mounted upon said disk adjacent to said shaft, means operatively associating the outer ends of said arms with said reciprocating members, a cam secured upon said shaft, and a roller upon each arm in operative engagement with said cam.

8. A device of the character described comprising a casing, a shaft rotatably mounted in the casing, a plurality of reciprocating members mounted upon said casing and surrounding said shaft, a circular frame having its peripheral portion rigidly secured to said casing, a disk upon said frame surrounding said shaft, arms positioned radially relatively to said shaft, said arms having their inner ends pivotally mounted upon said disk adjacent to said shaft, said frame having guides formed therein extending longitudinally relatively to said shaft, heads upon the outer ends of said arms slidably mounted in said guides, a pivotal connection between said heads and said reciprocating members, a cam secured upon said shaft having a working surface presented toward said frame, and rollers upon said arms having their peripheral portions in operative engagement with the working surface of said cam.

9. A device of the character described comprising a casing, a shaft rotatably mounted in the casing, a reciprocating member mounted upon the casing, cams rigidly secured upon said shaft, said cams having their working faces presented toward and in spaced relation to each other, a circular frame positioned between said cam faces having its peripheral portion rigidly secured to said casing, an arm positioned radially relatively to said shaft, a pivotal connection between said arm and said frame located adjacent to said shaft, a head mounted upon the opposite end of said arm, guides upon said frame between which said head is slidably mounted, a pivotal connection between said head and said reciprocating member, rollers mounted upon said arm between said head and said pivotal connection of the arm with the frame, and said cams being of different diameters with the working face of one cam in operative engagement with one of said rollers, and the working face of the other cam in engagement with the other roller.

10. A device of the character described comprising a casing, a shaft rotatably mounted in the casing, a reciprocating member mounted upon the casing, cams rigidly secured upon said shaft, said cams having their working faces presented toward and in spaced relation to each other, said working faces of the cams being of conical formation, a circular frame positioned between said cam faces having its peripheral portion rigidly secured to said casing, an arm positioned radially relatively to said shaft, a pivotal connection between said arm and said frame located adjacent to said shaft, a head mounted upon the opposite end of said arm, guides upon said frame between which said head is slidably mounted, a pivotal connection between said head and said reciprocating member, rollers mounted upon said arm between said head and said pivotal connection of the arm with the frame, and said rollers having conical working faces converging at said pivotal connection of the arm with the frame adapted to engage the respective working faces of said cams.

11. A device of the character described comprising a casing, a shaft rotatably mounted in the casing, a reciprocating member mounted upon the casing, cams rigidly secured upon said shaft, said cams having their working faces presented toward and in spaced relation to each other, a circular frame positioned between said cam faces having its peripheral portion rigidly secured to said casing, an arm positioned radially relatively to said shaft, a pivotal connection between said arm and said frame located adjacent to said shaft, a head mounted upon the opposite end of said arm, guides upon said frame between which said head is slidably mounted and adapted to move in a plane extending through the longitudinal axis of said shaft, a connection between said head and the reciprocating member, rollers mounted upon said arm at different distances from said shaft, said cams having their working faces of different diameters, the larger one of said cams having its working face in contact with the outer one of said rollers, and the smaller cam having its working face in contact with the inner one of said rollers.

12. A device of the character described comprising a casing, a shaft rotatably mounted in the casing, a reciprocating member mounted upon the casing, cams rigidly secured upon said shaft, said cams having their working faces presented toward and in spaced relation to each other, a circular frame positioned between said cam faces having its peripheral portion rigidly secured to said casing, an arm positioned radially relatively to said shaft, a pivotal connection between said arm and said frame located adjacent to said shaft, a head mounted upon the opposite end of said arm, guides upon said frame between which said head is slidably mounted and adapted to move in a plane extending through the longitudinal axis of said shaft, a connection between said head and the reciprocating member, rollers mounted upon said arm at different distances from said shaft, said cams having their working faces of different diameters the larger one of said cams having its working face in contact with the larger one of said rollers, and the smaller cam having its working face in contact with the other one of said rollers, said cams being of elliptical formation, and said cams positioned upon said shaft with the longer axis of one cam in longitudinal alignment with the shorter axis of the other cam relatively to said shaft.

13. A device of the character described comprising a casing, a shaft rotatably mounted in the casing, reciprocating members mounted upon the casing and movable in a line parallel with said shaft, a frame positioned transversely of said shaft having its periphery secured to the casing, arms pivotally mounted upon said frame adjacent to said shaft having their outer ends operatively associated with said reciprocating members, guides upon said frame in which the outer ends of the arms are slidably mounted, conical rollers mounted upon each of said arms located at different distances from said shaft, a relatively large cam secured upon said shaft having a conical working face in engagement with the outer one of said rollers of each arm, and a relatively smaller cam secured upon said shaft having a conical working face in engagement with the inner one of said roller of each arm.

14. A device of the character described comprising a casing, a shaft rotatably mounted in the casing, reciprocating members mounted upon the casing and movable in a line parallel with said shaft, a frame positioned transversely of said shaft having its periphery secured to the casing, arms pivotally mounted upon said frame adjacent to said shaft having their outer ends operatively associated with said reciprocating members, a roller mounted upon each of said arms, said arms each comprising detachable sections, means for detachably securing said sections together, a shoulder mounted upon one of said sections against which said roller is positioned, a collar adjustably mounted upon one of said sections adapted for adjustably positioning said roller upon the arm relatively to said shoulder, and a cam upon shaft shaft in operative engagement with said roller.

15. A device of the character described comprising a casing, a shaft rotatably mounted in the casing, reciprocating members mounted upon the casing and movable in a line parallel with said shaft, a frame positioned transversely of the shaft having its periphery secured to said casing, a disk forming part of said frame surrounding said shaft, radial braces connecting said disk with the periphery of the frame, arms pivotally mounted upon said disk and adapted to move through the spaces formed between said radial braces, rollers upon said arms, cams secured upon said shaft at opposite sides of said frame, said cams having working faces in operative engagement with said rollers, and means upon the outer ends of said arms operatively associating the latter with said reciprocating members.

16. A device of the character described comprising a casing, a shaft rotatably mounted in the casing, reciprocating members mounted upon the casing and movable in a line parallel with said shaft, a frame positioned transversely of the shaft having its periphery secured to said casing, a disk forming part of said frame surrounding said shaft, radial braces connecting said disk with the periphery of the frame, a disk detachably mounted upon said frame positioned in alignment with the first mentioned disk, bearing blocks mounted between said disks adjacent to said shaft, arms having a bifurcated end portion embracing said blocks, pivot pins for securing said end portions to said blocks, rollers upon said arms, cams secured upon said shaft at either side of said disks, said cams having working faces in operative engagement with said rollers, and means upon the outer ends of said arms operatively associating the latter with said reciprocating members.

17. A device of the character described comprising a casing, a shaft rotatably mounted in the casing, reciprocating members mounted upon the casing and movable in a line parallel with said shaft, a frame positioned transversely of the shaft having its periphery secured to said casing, a disk forming part of said frame surrounding said shaft, radial braces connecting said disk with the periphery of the frame, a disk detachably mounted upon said frame positioned in alignment with the first mentioned disk, bearing blocks positioned between said disks, stud-shafts upon each of said blocks rotatably mounted in said disks upon an axis extending parallel with said shaft, said blocks having holes formed therethrough at right angles to the axis of said stud-shafts, pivot pins detachably mounted in said holes in the pivot-blocks, arms having a bifurcated end portion embracing said blocks and secured thereto by said pivot pin, rollers upon said arms, cams secured upon said shaft at either side of said disks, said cams having working faces in operative engagement with said rollers, and means upon the outer ends of said arms operatively associating the latter with said reciprocating members.

18. A device of the character described comprising a casing, a shaft rotatably mounted in the casing, reciprocating members mounted upon the casing and movable in a line parallel with said shaft, a frame positioned transversely of said shaft, a peripheral segmental flange upon said frame, an inwardly extending flange upon said casing against which said segmental flange is detachably secured, guides upon said segmental periphery of the frame arranged in pairs forming open end cross-head guides, cross-heads slidably mounted between said cross-head guides, pivotal connections between said cross-heads and said reciprocating members, arms upon which said cross-heads are mounted, said arms positioned radially relatively to said shaft, pivotal connections between the inner ends of the arms and said frame located adjacent to said shaft, rollers upon said arms, cams secured upon said shaft at either side of said frame, and working faces upon said cams in operative engagement with the rollers.

19. A device of the character described comprising a casing, a shaft rotatably mounted in the casing, reciprocating members mounted upon the casing and movable in a line parallel with said shaft, cams having centrally positioned sleeves secured upon said shaft, a collar upon said shaft against which one of said sleeves abuts, detachable means upon said shaft adapted for holding said sleeves against said shoulder, a transverse frame positioned between said cams, means for rigidly securing the peripheral portion of said frame to said casing, bearings upon said sleeves between which the central portion of said frame is mounted and held against longitudinal movement relatively to said shaft, arms having their outer ends operatively associated with said reciprocating members, pivotal connections between the inner ends of said arms and said central portion of said frame, and rollers mounted upon said arms having their peripheral portions in operative engagement with said cams.

20. A device of the character described comprising a casing, a shaft rotatably mounted in the casing, reciprocating members mounted upon the casing and movable in a line parallel with said shaft, an inwardly projecting flange upon said casing extending transversely relatively to said shaft, a transverse frame mounted upon said flange, said frame having a central opening occupied by said shaft, radial arms pivotally mounted upon the central portion of said frame adjacent to said shaft, said frame having radial members between which said arms are adapted to oscillate, cams secured upon said shaft at either side of said arms, rollers upon said arms in operative engagement with said cams, heads formed upon the outer ends of said arms, cross-head guides of open channel formation carried by the peripheral portion of said frame between which said heads oscillate, connections between said heads and said reciprocating members, a ring mounted upon the opposite end of said frame relatively to said casing, a casing cover surrounding said frame, means for detachably securing the casing cover to said casing, a transverse end wall upon said casing cover, and an annular flange upon said end wall upon which said ring of the frame is mounted.

21. A device of the character described comprising a casing, a shaft rotatably mounted in the casing, a reciprocating member mounted upon the casing, disk cams secured upon the shaft having conical working faces upon their peripheries, said faces presented toward each other whereby the space between the working faces of the cams will vary due to radial expansion of the cams relatively to said shaft, rollers positioned between the faces of said cams each having its periphery in contact with the working face of one of said cams, an arm upon which said rollers are mounted, a bearing upon the casing positioned between said cams and located adjacent to said shaft, said arm having one end thereof pivotally mounted in said bearing and extending radially from said shaft, said rollers having conical working faces in alignment with the center of oscillation of said arm, said arm and said rollers adapted to expand and contract uniformly with said cams insuring perfect contact between the working faces of the cams and rollers, and a connection between the outer end of the arm and said reciprocating member for oscillating the arm and rollers.

In testimony whereof I affix my signature.

CALVIN C. WILLIAMS.